May 30, 1967     J. P. McCLUNG ETAL     3,322,434

TOP JAW HOLDERS AND TOP JAWS THEREFOR

Filed July 16, 1964     3 Sheets-Sheet 1

JACK P. McCLUNG
HENRY R. BARNES
INVENTORS.

KENDRICK AND STOLZY
BY
*Harold Stolzy*
ATTORNEYS

May 30, 1967  J. P. McCLUNG ETAL  3,322,434
TOP JAW HOLDERS AND TOP JAWS THEREFOR
Filed July 16, 1964  3 Sheets-Sheet 2
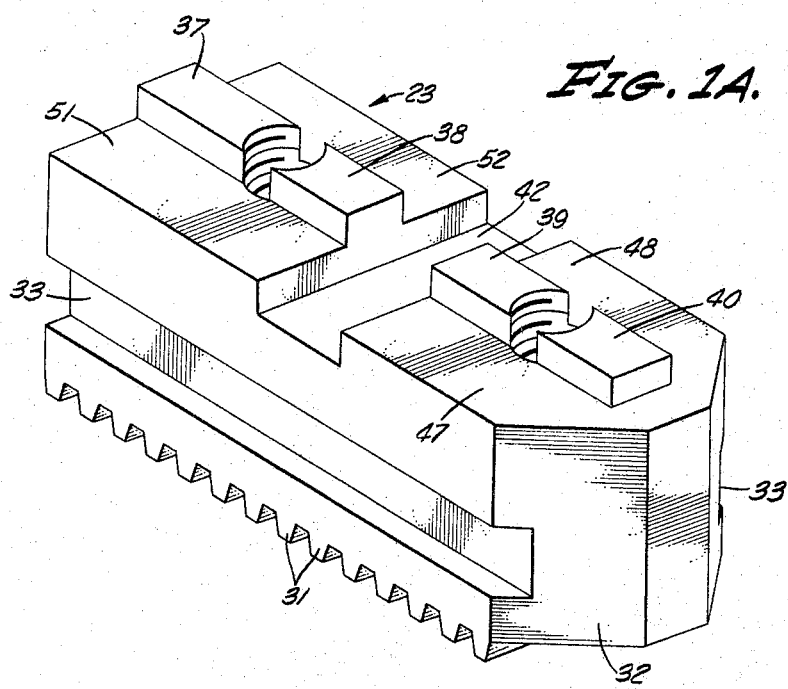
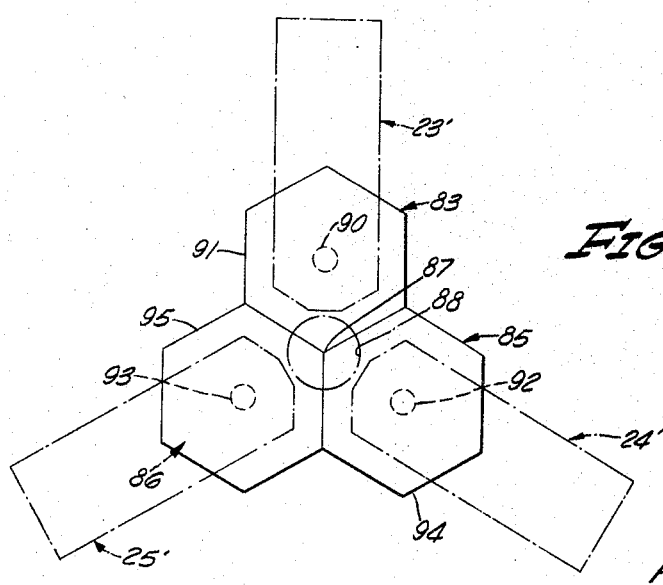
JACK P. McCLUNG
HENRY R. BARNES
INVENTORS
KENDRICK AND STOLZY
BY
ATTORNEYS May 30, 1967

J. P. McCLUNG ETAL 3,322,434

TOP JAW HOLDERS AND TOP JAWS THEREFOR

Filed July 16, 1964

JACK P. McCLUNG
HENRY R. BARNES
INVENTORS.

KENDRICK AND STOLZY
BY
A. Donald Stolzy

ATTORNEYS

United States Patent Office 3,322,434
Patented May 30, 1967

3,322,434
TOP JAW HOLDERS AND TOP JAWS THEREFOR
Jack P. McClung, 12728 Foster Road, and Henry R. Barnes, 14634 Pioneer Blvd., both of Norwalk, Calif. 90650
Filed July 16, 1964, Ser. No. 383,172
5 Claims. (Cl. 279—123)

This invention relates to chuck accessories, and more particularly to top jaws for chucks and to devices for mounting top jaws on a chuck.

Although the present invention will have applications other than those disclosed herein and should not be limited to this disclosure for that reason, this invention has been found to possess exceptional utility when employed with a conventional universal chuck having three jaws.

In the past, it has been the practice to mount top jaws or mild steel pads on a top jaw holder. The holder is, in turn, bolted to a chuck jaw. The top jaws of the prior art have been time consuming and expensive to machine. Further, it has not been possible to hold work of a small diameter with top jaws of the prior art. In addition, once a prior art top jaw is machined to hold a piece of work of a predetermined diameter, the same top jaw cannot be used for pieces of work of a diameter smaller than the said predetermined diameter.

In accordance with the present invention, the above-described and other disadvantages of the prior art are overcome by providing a top jaw holder including a body having a cavity to receive a top jaw, and means to clamp a top jaw in the cavity. By making the cavity uniform in cross section and cylindrical, hexagonal, square or triangular in shape, it is possible to use short lengths of stock sections for top jaws. In some cases, machining is wholly unnecessary. Further, the present invention is not limited to the four specific cavity shapes just enumerated.

By using a top jaw with sector-shaped head and a smaller shank, it is possible to hold work of a diameter all the way to zero. For example, the sectors of an equilateral hexagon fit close together on a three-jaw chuck if hexagon top jaw heads are made sufficiently large. They so fit together without any substantial space existing between top jaw heads. This means that pieces of work of a diameter down to zero may be held in the space between top jaws constructed in accordance with this feature of the present invention.

In accordance with another feature of the present invention, a set of top jaws in the holders of the invention may be mounted in any one of at least two, and up to and including six positions. This means that the self same set of top jaws so constructed may be used to hold pieces of work of six different diameters.

The above-described and other advantages of the present invention will be better understood from the following description when considered in connection with the accompanying drawings.

In the drawings, which are to be regarded as merely illustrative:

FIG. 1A is a perspective view of a conventional chuck jaw;

FIG. 6A is an elevational view similar to that shown in FIG. 2 with three top jaws of the type shown in FIG. 6;

It is conventional to employ mild steel top jaws on a chuck. This is especially true of a universal chuck. In this case, the top jaws are drilled out to fit precisely the outside diameter of a workpiece. This makes it possible to operate chuck jaws at a position approximately midway between their extreme limits of travel. For this reason, damage to the chuck jaws is prevented. Further, the top jaws can be returned precisely to the center of a workpiece regardless of chuck wear.

The top jaws of the present invention serve the same purpose as top jaws of the prior art. However, the top jaws of the present invention have many advantages other than those of top jaws of the prior art.

Figures 1, 3:
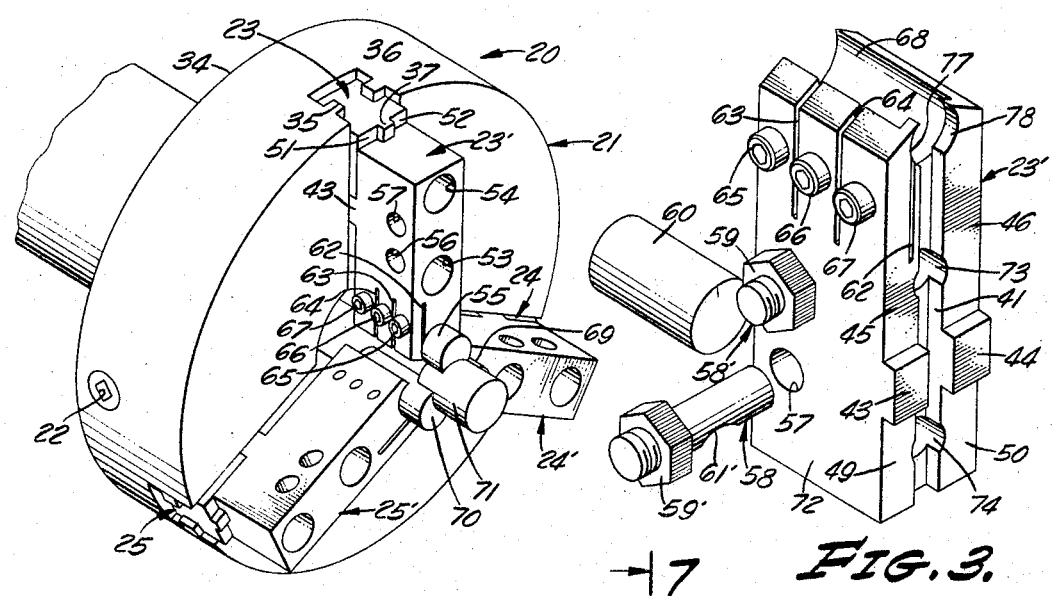
FIG. 1 is a perspective view of a lathe and a universal chuck therefor to which top jaw holders and top jaws are mounted in accordance with one embodiment of the present invention.
FIG. 3 is an exploded perspective view of a portion of the structure shown in FIGS. 1 and 2.

In FIG. 1, a lathe is indicated generally at 20 having a conventional universal chuck 21. Chuck 21 has a conventional keyway 22 to fit a square key for moving jaws 23, 24 and 25 radially inwardly and outwardly. This function is performed by a conventional spur gear, not shown, fixed with keyway 22, and a crown gear, not shown. The crown gear is fixed to a scroll or ring 26 shown in FIG. 7, which has a spiral groove 27 therein.

Chuck jaw 23 is shown in FIG. 1A. All the jaws 23, 24, and 25 may be identical. Further, all the chuck jaws shown in the drawings herein may be identical.

Figure 9:
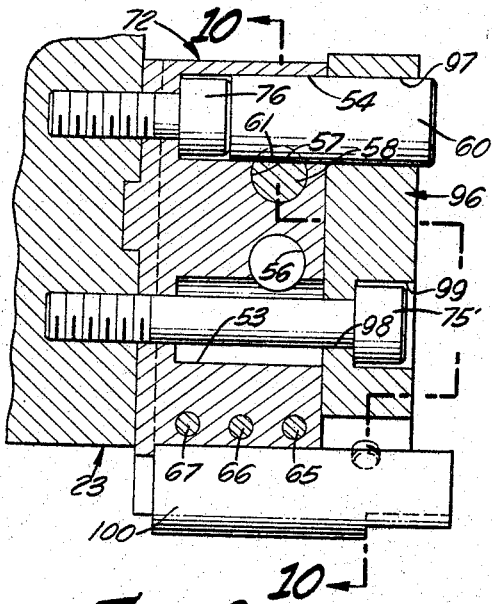
FIG. 9 is a longitudinal sectional view through a top jaw holder constructed in accordance with an alternative embodiment of the present invention.
Figure 10:
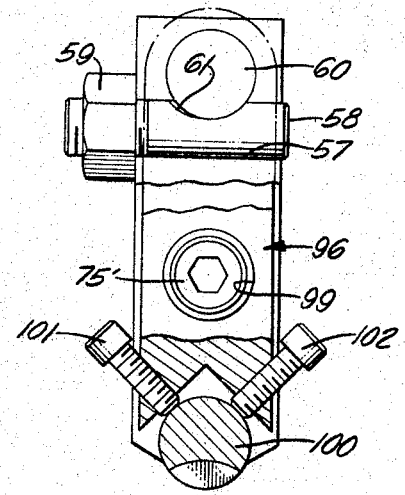
FIG. 10 is a broken away sectional view taken on the line 10—10 of apparatus shown in FIG. 9.

All of the structures shown herein are related to the single embodiment of the invention shown in FIG. 1 with the exception of FIGS. 9 and 10.

Figure 11:
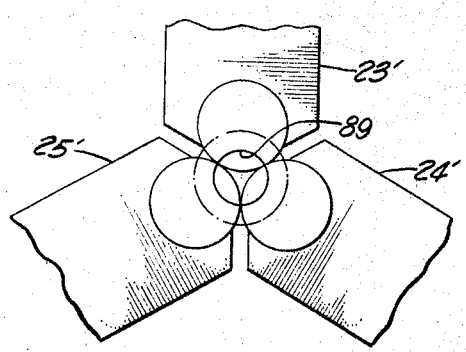
FIG. 11 is a view similar to that of FIG. 2 with a piece of work shown in three top jaws of a diameter smaller than work indicated in FIG. 2.

Chuck 23, shown in FIG. 1A, has a rear surface of ribs 31 which fit in spiral groove 27 of scroll 26. Jaw 23 has a beveled inner end at 32 to fit in tight, as do the noses of the three top jaw holders 23', 24' and 25' shown in FIGS. 1 and 11.

Jaw 23 is symmetrical about its longitudinal axis. It has keyways 33 on opposite sides thereof. Chuck 21 has a body 34 with ribs 35 and 36 which fit in keyways 33. Chuck 23 has keys at 37, 38, 39 and 40 which fit in a keyway 41 in holder 23' shown in FIG. 3. Chuck 23 also has a keyway 42 to receive keys 43 and 44 on holder 23'.

Keys 37, 38, 39 and 40 are shorter than keyway 41. Similarly, keys 43 and 44 are shorter than keyway 42. For these reasons, holder surfaces 45 and 46 rest upon chuck jaw surfaces 47 and 48, respectively. Similarly, holder surfaces 49 and 50 rest upon chuck jaw surfaces 51 and 52, respectively.

Due to the fact that all of the chuck jaws shown in the drawings are identical, only chuck jaws 23 has been described in detail. Further, all of th top jaw holders shown in the drawings are identical. For this reason, only top jaw holder 23' will be described in detail.

Note will be taken that top jaw 23' has bores at 53 and 54 to receive top jaws. A top jaw is shown at 55. Top jaw 55 may alternatively be mounted in its position shown in FIG. 1, or in either one of bores 53 and 54. Holder 23' has bolt holes at 56 and 57 to receive a bolt of the kind shown at 58 in FIG. 10. Bolt 58 has a nut 59 to draw bolt 58 tight against a pin or top jaw 60. Note will be taken that bolt 58 has a crescent shaped portion removed therefrom at 61. The surface of bolt 58 at 61 is slightly larger than the diameter of pin 60. When bolt 58 is located in hole 56 as indicated at 58' in FIG. 7, a top jaw may be held tightly within bore 53. When bolt 58 is located in bore 57, a top jaw may be held tightly in bore 54.

Figure 8:
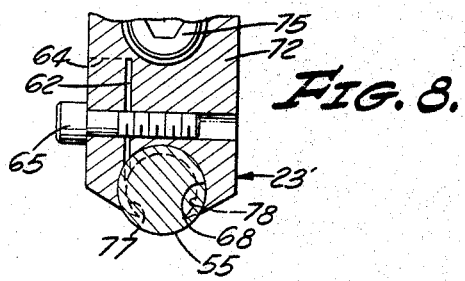
FIG. 8 is a longitudinal sectional view through a top jaw holder taken on the line 8—8 of the embodiment of the present invention shown in FIG. 7.

The inner end of top jaw holder 53' is vertically slotted at 62, and horizontally slotted at 63 and 64. Holder 23' then is provided with cap screws at 65, 66 and 67 which are threaded thereto. Tightening of cap screws 65, 66 and 67 clamps top jaw 55 tightly within a cylindrical bore 68 which has an arcuate extent of more than 180°, as shown in FIG. 8.

Top jaw holders 24' and 25' similarly hold top jaws 69 and 70, respectively, in a manner identical to the manner in which top jaw 55 is held by holder 23'. Further, top jaws 55, 69 and 70 are identical.

Note will be taken that top jaws 55, 69 and 70 hold a piece of work 71 in FIG. 1.

Figures 2, 5:
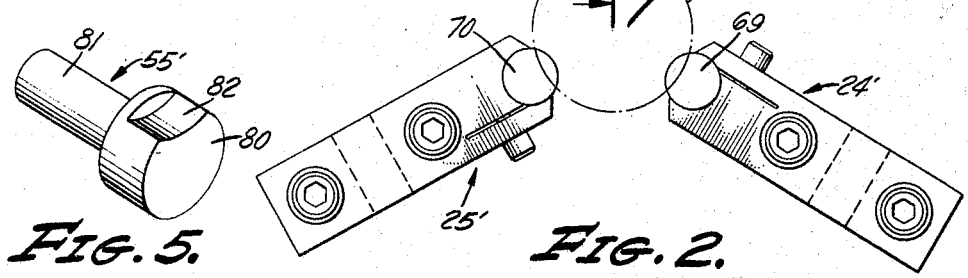
FIG. 2 is a front elevational view of a portion of the structure shown in FIG. 1.
Figure 7:
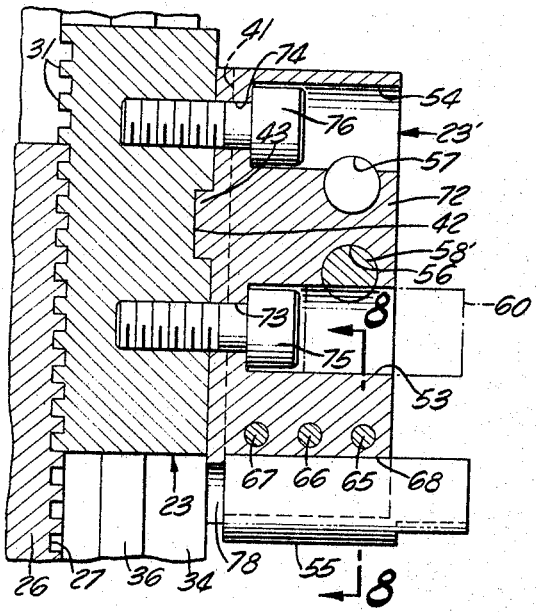
FIG. 7 is a sectional view through a structure taken on the line 7—7 shown in FIG. 2.

As shown in FIGS. 2 and 7, holder 23' has a body 72 that has bores 73 and 74 counter to bores 53 and 54. Cap screws 75 and 76 are located in bores 53 and 54. Cap screws 75 and 76 are threaded to chuck jaw 23.

As shown in FIG. 2, work 71 may be located at 71' within top jaws 55, 69 and 70.

As shown in FIG. 3, the lower end of bore 68 has flanges at 77 and 78.

Figure 4:
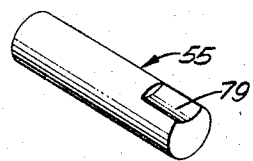
FIGS. 4, 5 and 6 are perspective views of top jaws constructed in accordance with the present invention.

As shown in FIG. 4, top jaw 55 may be machined at 79.

Alternatively, a top jaw 55' may be provided as shown in FIG. 5. Top jaw 55' has a head portion 80 and a shank portion 81. Head portion 80 has a diameter greater than that of shank portion 81. Head portion 80 is machined at 82. Note will be taken that shank portion 81 will be located in one of the bores 68, 53 and 54 of holder 23' or in a corresponding bore in one of the holders 24' and 25'.

Figure 6:
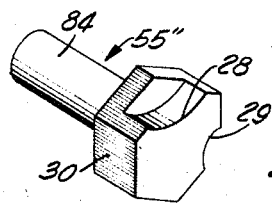

Still another holder constructed in accordance with the present invention is indicated at 55'' in FIG. 6. Holder 55'' has a hexagonal shaped head portion 30 and a cylindrical shank portion 84. Note will be taken that shank portion 84 has a diameter at least smaller than the diagonal dimension of the hexagon of head 30. Note will be taken that it is possible that head 30 may be machine at each one of the six hexagonal edges so that three top jaws constructed in accordance with the embodiment of the invention shown in FIG. 6 might be used for pieces of work of six different corresponding diameters.

Notwithstanding the foregoing, machined cuttings in head 30 are indicated only at two edges. These cuttings are indicated at 28 and 29.

In FIG. 6A, top jaws at 83, 85 and 86 are shown for holders 23', 24' and 25'. Top jaws 83, 85 and 86, before they are machined to receive a piece of work, can fit together at a single point 87. They may then be machined in a manner similar to that shown in FIG. 6A or FIG. 11 at 88 and 89, respectively.

Top jaw 83 has a cylindrical shank 90 and a hexagonal head 91. Top jaws 85 and 86 have cylindrical shanks 92 and 93, and hexagonal heads 94 and 95, respectively.

An accessory for jaw 23 and holder body 72 is shown in FIGS. 9 and 10. Cap screw 76 is employed in holder bore 54. Pin or top jaw 60 is located above cap screw 76. An accessory plate 96 is provided which has a bore 97. Pin 60 projects upwardly through plate bore 97.

A cap screw 75', longer than cap screw 76, is located in a bore 98 in plate 96. A counterbore 99 is also provided in plate 96. Bolt 75' holds plate 96 tight against holder body 72.

Cap screws 65, 66 and 67 draw the end of holder body 72 tight against a top jaw 100. Top jaw 100 is pressed by set screws 101 and 102 threaded through plate 96.

Note will be taken that top jaws 83, 85 and 86, shown in FIG. 6A, may be employed to hold a piece of work having a diameter down to zero. Further, each of the top jaws 83, 85 and 86 may be machined at six positions therearound.

In order to hold work pieces of a size down to a diameter of zero, the inserted pie-shaped sections of top jaw heads, for example, as shown at 30 in FIG. 6, must have an angular extent of $360/n$ degrees, where $n$ is the number of jaws of the chuck that holds them in place. In order to retain this feature and provide further the feature of being able to machine a top jaw head 29 at least at two positions, for example as at 28 and 29 in FIG. 6, it is necessary to use a polygon head having at least two angles equal to $360/n$ degrees. It will be noted that the maximum number of positions for machining may be obtained by a hexagon. This is true because the number, $s$, of polygon sides is determined by the equation $$s = \frac{2n}{n-2}$$

Thus, for a minimum number of chuck jaws of three, the maximum number of polygon sides is six. Further, the maximum number of chuck jaws is six for at least two machining edges. This is true because the number of sides of a polygon cannot fall below three and the sides by the formula $$s = \frac{2n}{n-2}$$

falls below three when $n$ exceeds six.

In accordance with the foregoing, some advantages may be achieved by making the jaw angle of the top jaw head $360/n$ degrees. Further, advantages are obtained by making a top jaw head a polygon with at least two angles equal to $360/n$ degrees.

A still further advantage is obtained by employing an equilateral polygon having sides $$s = \frac{2n}{n-2}$$

In the instances of equilateral polygons, the present invention is limited to top jaws of cross sections in the form of equilateral triangles, squares and equilateral hexagons.

By making bores or cavities 68, 53 and 54 uniform in cross section and cylindrical, hexagonal, square or triangular in shape, it is possible to use short lengths of stock sections for top jaws. In some cases, machining is wholly unnecessary. For example, the rod of top jaw 55 shown in FIG. 4 may be a stock rod.

Notwithstanding the foregoing, the present invention is not limited to the four specific cavity shapes just enumerated.

The use of hexagonal heads 55'', 91, 94 and 95 also provides means by which pieces of work down to a diameter of zero may be held. Note will be taken that no space exists between heads 91, 92 and 95 shown in FIG. 6A.

Also, as stated previously, each of the six edges of the hexagon of each of the heads 91, 94 and 95 may be machined to hold pieces of work of six different corresponding diameters.

Although only a few embodiments of the present invention have been described and illustrated herein, many changes and modifications thereof will of course suggest themselves to those skilled in the art. The present invention should therefore not be limited to the embodiments selected for this disclosure, the true scope of the invention being defined only in the appended claims.

What is claimed is:

1. In a lathe having a chuck with at least three jaws, each of said jaws having a longitudinal key, transverse keyways, and two radially spaced tapped holes, the combination comprising: a top jaw holder for each of said jaws, each holder having two axial bores therein, a counterbore for each of said bores to provide a flange, a cap screw in each of said bores holding each of said flanges tight against each corresponding jaw, said cap screws being threaded into said tapped holes, each of said holders having a body with keys and a keyway fitting in and around said jaw keyways and key, each of said holders having two transverse holes, each of said transverse holes partially intercepting a corresponding one of said bores, a bolt having a keyway therein, said bolt extending through one of said transverse holes, said keyway being positioned to engage a top jaw in a corresponding one of said bores.

2. In a lathe having a chuck with at least three jaws, each of said jaws having a longitudinal key, transverse keyways, and two radially spaced tapped holes, the combination comprising: a top jaw holder for each of said jaws, each holder having two axial bores therein, a counterbore for each of said bores to provide a flange; means on one end of each of said holders to clamp a top jaw in position, said one of said bores being located at the other end of each of said holders; a guide pin in said one bore of each holder and extending outwardly thereof; and accessory plate having a first bore surrounding each said guide pin, said plate having a second bore and smaller counterbore providing a flange, said plate counter bore being concentric with the other of said holder bores; a cap screw below said guide pin threaded to each corresponding chuck jaw; a cap screw extending through said plate second bore also threaded to a corresponding chuck jaw; and a pair of set screw braces threaded to said plate to engage a top jaw clamped to each of said holders.

3. In a chuck having a plurality of jaws, the combination comprising: a top jaw holder fixed to each jaw; an axial hole in each top jaw holder; a transverse hole in each top jaw holder partially intercepting the axial hole therein; a cylindrical top jaw in each axial hole; a bolt in each transverse hole, each bolt having a keyway to receive each corresponding top jaw; and means for drawing each bolt outwardly of each corresponding transverse hole to clamp each corresponding top jaw in its axial hole.

4. The invention as defined in claim 3, wherein said drawing means includes a nut threaded to each bolt.

5. In a top jaw holder, the combination comprising: a chuck, a top jaw holder on said chuck, said holder having a pair of top jaw encircling projections at one end, the ends of said projections being spaced apart, said top jaws being insertable in between said projections in a direction parallel to the axis of said chuck, said top jaw extending radially beyond the ends of said projections to hold a work piece along substantially the entire axial length of said top jaw, said holder having a split extending axially between said projections to permit bending thereof, one of said projections having a slot extending radially therethrough to facilitate said bending; and means to pull said projections toward each other to hold said top jaw therebetween.

References Cited
UNITED STATES PATENTS

| | | | |
|---|---|---|---|
| 2,401,971 | 6/1946 | Schuster | 279—123 |
| 2,667,358 | 1/1954 | Highberg | 279—123 |
| 2,781,199 | 2/1957 | Veldhuizen | 279—97 |
| 2,926,922 | 3/1960 | Vermette | 279—123 |
| 2,950,117 | 8/1960 | Walmsley | 279—123 |
| 3,163,433 | 12/1964 | Ross | 279—123 |
| 3,190,664 | 6/1965 | Hohwart | 279—123 |

FOREIGN PATENTS

| | | |
|---|---|---|
| 21,612 | 11/1893 | Great Britain. |

OTHER REFERENCES

American Machinist, Dec. 5, 1946, p. 144, Prongnell-Soft Hexagon False Jaws.

ROBERT C. RIORDON, *Primary Examiner.*

H. V. STAHLHUTH, *Assistant Examiner.*